United States Patent [19]
Bell

[11] 3,727,667
[45] Apr. 17, 1973

[54] SINGLE SET-UP SEQUENTIAL HEAT PROCESS FOR MAKING DIAMOND HEAT SINKS

[76] Inventor: Graham H. Bell, 1311 Lucinda Way, Tustin, Calif. 92680

[22] Filed: Nov. 30, 1971

[21] Appl. No.: 203,192

[52] U.S. Cl. ............... 164/80, 164/105, 164/112, 164/120, 164/122
[51] Int. Cl. .................. B22d 23/06, B22d 19/06
[58] Field of Search ............... 164/80, 91, 94, 95, 164/96, 98, 99, 100, 101, 102, 103, 104, 105, 106, 107, 108, 109, 110, 111, 112, 120, 122, 312, 314, 315, 319, 321, 322, 332, 333, 334

[56] References Cited

UNITED STATES PATENTS

| | | | |
|---|---|---|---|
| 2,363,272 | 11/1944 | Taeyaerts et al. | 164/110 X |
| 2,396,015 | 3/1946 | Liden et al. | 164/110 X |
| 2,457,156 | 12/1948 | Jones | 164/110 X |
| 3,171,175 | 3/1965 | Curcio | 164/80 X |

FOREIGN PATENTS OR APPLICATIONS

465,702  5/1937  Great Britain ................... 164/110

Primary Examiner—J. Spencer Overholser
Assistant Examiner—John E. Roethel
Attorney—Wm. Jacquet Gribble

[57] ABSTRACT

A multiple-cavity mold with vertical cavities receives a layered "stack" in each cavity. The stack or charge includes a diamond crystal, a brazing metal alloy and a casting metal slug all of which are impinged upon by a tungsten rod which may or may not become a part of the final stack assembly. The mold is evacuated and the contents heated in temperature stages or steps such that the brazing alloy melts before the casting slug. The temperature is then diminished at a rate to anneal the casting metal in the assembly. Preferably the brazing alloy is a combination of a transitional metal with a noble metal. The casting metal is of a superior heat-conducting material, such as copper or silver, and may be alloyed.

12 Claims, 15 Drawing Figures

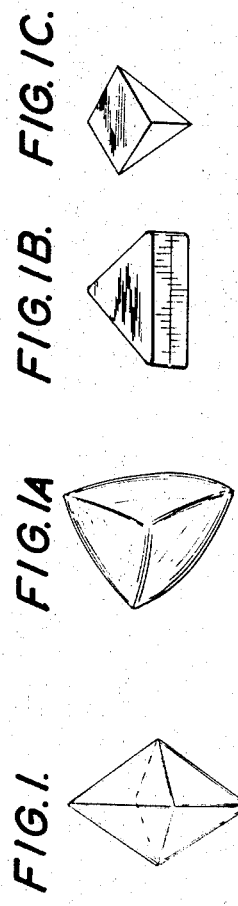
FIG.1. FIG.1A. FIG.1B. FIG.1C.
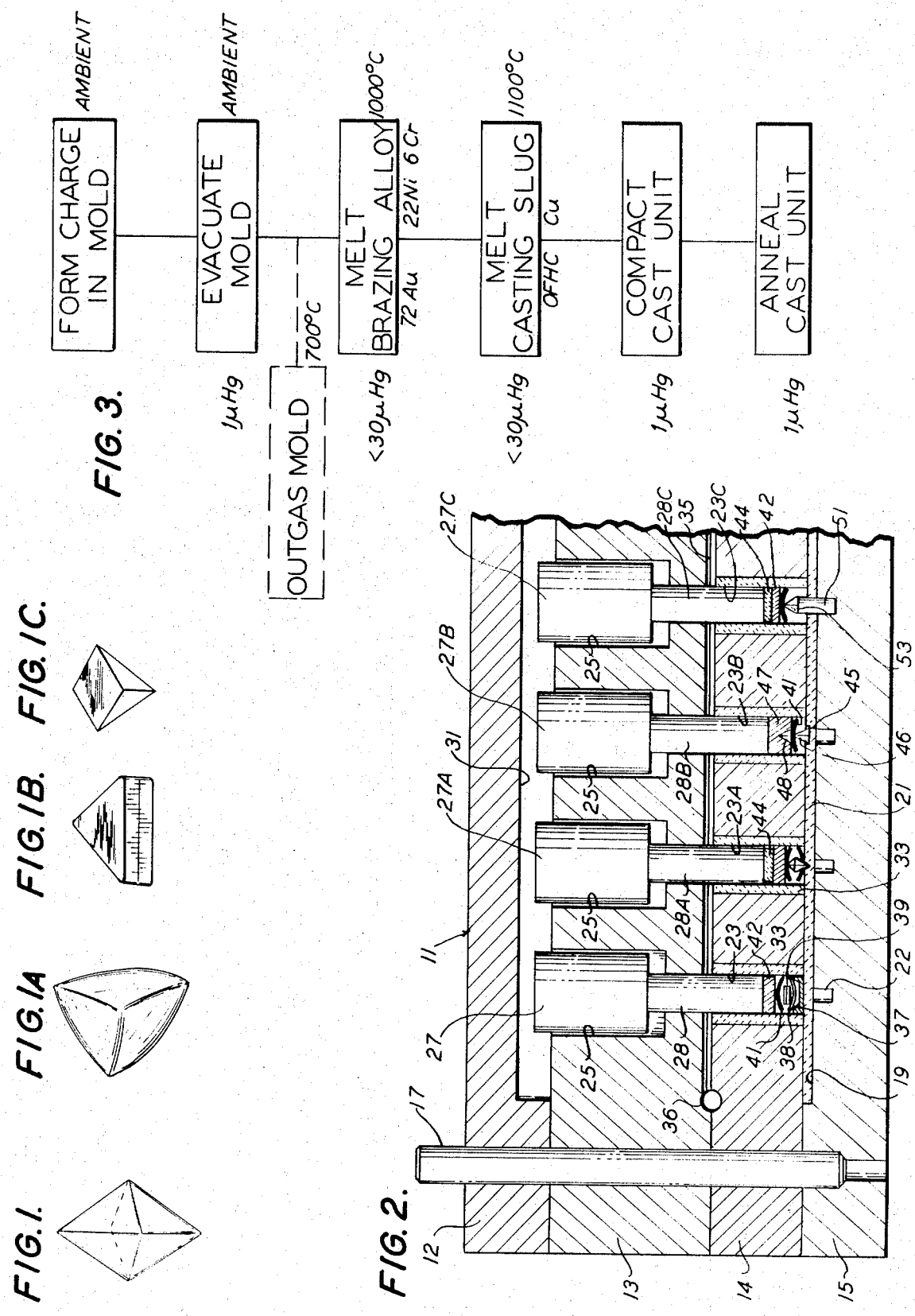
FIG.3.
FIG.2.

PATENTED APR 17 1973 3,727,667

SINGLE SET-UP SEQUENTIAL HEAT PROCESS FOR MAKING DIAMOND HEAT SINKS

BACKGROUND OF THE INVENTION

The invention relates to process and apparatus for forming diamond heat sinks for use with junction laser diodes, avalanche diodes, oscillators, diode rectifiers, gallium arsenide lasers, light-emitting diodes and the like.

Copper heat sinks have long been used to dissipate heat in various electronic devices. However, use of type IIa diamonds as heat sinks because of the superior heat transfer qualities of such crystals is increasingly popular. For instance, in heat sinks of the same general dimensions, the copper one has a two-watt capacity whereas a type IIa diamond heat sink has a 15-watt capacity.

One of the problems with creating diamond heat sinks is the difficulty of forming a thermal conducting as well as mechanical bond between the surface of the diamond and the particular electronic component. Experimentation has proven the desirable characteristic of the transition elements to adhere to the surface of diamonds and bond with other metals. "Transition elements" are those which have incomplete electron "$d$" shells, and form compounds with carbon.

I have invented process and apparatus using transition element alloys to "wet" the diamond surface and be welded to superior heat-conducting bonding metals, such that a diamond heat sink is easily and precisely formed, obviating the difficult mechanical steps formerly necessary to bond the diamond macle or twin crystal with a carrier to hold it in place.

The invention contemplates a process and apparatus implementing the process wherein a highly conductive diamond or partial diamond crystal is placed within the cavity of a mold adjacent a thin brazing alloy and a casting slug in a stack and then is impelled into contact with the brazing alloy and the casting slug by a weight placed atop the stack in the mold cavity. The cavity is then evacuated and the mold and its contents heated to induce outgassing of the assembly. After outgassing the temperature is raised to the melting point of the brazing alloy to cause the alloy to melt and wet the diamond surface, after which the temperature is again raised to melt the casting slug which flows about the "wetted" diamond and assumes the shape of the mold and adheres to the "wet" layer. The temperature of the evacuated mold is then reduced at a rate commensurate with annealing the casting metal.

The apparatus of the invention may include, in addition to the mold, a tungsten or other relatively inert metal weight which impels the casting slug and the brazing alloy about the diamond. Further apparatus may include a ceramic wafer between the tungsten weight and the casting slug to preclude the bonding of the two. Conversely, the tungsten and casting slug may bond to provide a mandrel for further working of the united diamond and molded casting slug. After removal from the mold, the united casting slug and diamond may be worked to the desired finished shape.

The apparatus of the invention preferably includes a multi-layered mold having mold layers in which the casting cavities are defined. The mold layers may include a mold cover, a mold weight guide and a mold cavity section and a mold base, all held in alignment by pins. The mold is thus separable and reusable after each molding operation. The number of molding cavities in the mold is dictated by the production needs of the particular user of the process.

Preferably the transition metal is between 0.1 to 15 per cent by weight of the brazing alloy with a gold, silver or copper base. Such alloys liquefy at a temperature of approximately 1,000° C, which is below the heat at which the diamond crystal is damaged.

Since the process results in unity between the diamond and the bonding metals, heat transfer is uninhibited and diamonds of any shape may be utilized in the sink, making diamond preshaping unnecessary.

These and other advantages of the invention are apparent in the following detailed description and drawing in which:

FIGS. 1, 1A, 1B and 1C illustrate common diamond crystal shapes;

FIG. 2 is a schematic sectional elevation of a mold embodying the invention;

FIG. 3 is a diagram of the process of the invention;

In the varying Figures like reference characters are used for like parts.

DESCRIPTION OF THE PREFERRED EMBODIMENTS

Figure 4:
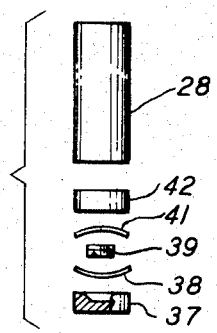
FIG. 4 is an exploded view illustrating the sequential placement of elements within a mold cavity.

In FIG. 1 a multi-layer, multi-cavity mold 11 is made up of horizontal layers including a cover 12, a mold weight guide 13, a mold cavity section 14 and a mold base 15. The mold layers may be of ceramic or dense graphite, ceramic having better wearing qualities and graphite contributing to de-oxygenization of the mold during evacuation. The mold may comprise a graphite-ceramic combination.

A plurality of aligning pins, such as the pin 17, orient the mold layers properly. Mold base 15 has a shallow recess 19 which opens upwardly and receives a mold plate 21 which may be of alumina. A plurality of cylindrical recesses 22 in the mold base, each aligned with a cylindrical mold cavity 23, may receive support posts for reasons to be discussed later.

The mold cavities 23 extend vertically through the mold cavity section 14 and align with stepped weight chambers 25 in the mold weight guide section 13. Each weight cavity 25 contains a cylindrical weight 27, 27A, 27B, 27C, preferably of tungsten, which bears upon a tungsten rod 28 through 28C, respectively, each of which bears upon a cavity charge in each of the cylindrical mold cavities 23. The rod may be a tungsten-thorium alloy.

The size of the weights may vary with the type of charge in the cavity and it is therefore desirable to provide a downwardly opening recess 31 in mold cover 12 to accommodate adjustment of the weights within the mold.

For the purposes of illustration four cavities of the mold are shown. Also illustratively, each cavity is shown containing a differing charge to illustrate the versatility of the invention, although each of the cavities in the mold may contain a similar charge, depending upon the production requirements of its use.

Preferably, the mold is made of dense graphite because the graphite produces a localized reducing effect by interaction of the hot graphite with oxygen molecules still present in the vacuum furnace during and after evacuation. Since the molten alloy may bond to graphite and subject it to damage on separation, a ceramic liner 33 preferably surrounds each mold cavity. The invention does not preclude molds made entirely of ceramics and provided with a gettering system in order to scavenge oxygen molecules from the rarefied atmosphere within the mold. The molds may be provided with grooves 35 connecting to bores 36, which, in turn, connect to the pressure reduction system (not shown) that induces the vacuum condition desired for the molding technique. The channels 35 and 36 are only indicative of the many arrangements whereby gases may be evacuated from the mold cavities.

Cavity 23 has a stacked charge comprising a recessed casting slug 37, a concave brazing foil 38, a diamond macle 39 like that of FIG. 1B, a second brazing foil 41 and a casting slug disc 42. The macle 39 is representative of the various types of diamonds and diamond segments which may be desired to perform the particular heat sink operation to which the process and apparatus are directed. In FIG. 1, an octahedron is illustrated in oblique view. In FIG. 1A a twinned diamond crystal or "pillow" is shown. FIG. 1B shows a twinned "window" macle.

In FIG. 1C one-half of an octahedral diamond is illustrated, the crystal having been divided along its equatorial axis.

Returning to FIG. 2, the stacked charge in cavity 23 is borne upon by tungsten rod 28 which communicates the downward load of tungsten weight 27 to the charge. Weight and rod may be unitary or separate parts. As heat is applied in a manner to be described later, the weight and rod push against the softening slugs and foils to intimately surround the macle with a wetting or brazing material.

In the cavity charge shown in cavity 23A, an octahedral diamond 43 like that of FIG. 1 rests between two oppositely oriented concave foils 38, 41 beneath a copper slug 42 which supports a ceramic disk 44. The point of diamond 43 is held by adhesive 40 in openings in the foil 38 and ceramic plate 21. A tungsten rod 28A seats upon the disk 44 and is borne upon by weight 27A. While the charge in cavity 23 when melted attaches in welded fashion to the end of tungsten rod 28 to form a mandrel expediting further handling of the unified charge in preparing the diamond and charge for final use, the inert ceramic disc 44 in cavity 23A separates the charge and rod such that the charge and rod are removable separately.

The charge in cavity 23B comprises a sawn diamond 46 resting in a locator recess 45 within alumina ceramic plate 21 and covered by a brazing foil 41 which is borne upon by a casting slug 47 having a conical or pyramidal cavity 48 aligned and conformed to substantially match the position and configuration of the sawn diamond 46. Once again the tungsten rod 28B is welded to the casting slug 47, becoming a part of the unitized charge and forming a mandrel for further processing into a heat sink or cutting tool, as desired.

In the charge in the cavity 23C the charge is supported in part upon a molybdenum post 51 registered in cylindrical cavity 22 in alignment with the mold cavity 23C. A half-diamond crystal is cemented to the top of the post to insure its alignment within the cavity. A preformed brazing or wetting alloy foil 41 rests upon the top of the diamond and is topped by a casting slug like slug 42. Rod 28C and weight 27C bear upon the casting slug and upon the rest of the charge within cavity 23C. While a half crystal has been shown in place on post 51, natural diamond crystals of any suitable shape may be bonded thereto in desired orientation by adhesives such as Aremco "Ceramabond 503." Elevating the diamond above the bottom of the mold cavity on the post permits the cast metal to flow fully around and below the sides of the diamond and thus produce a full metal diameter at the diamond face 53 by locating the rounded corners resulting from surface tension of the molten metal below the diamond face. A ceramic separator 44 may intervene between post 28C and casting slug 42 to preclude bonding of the charge to the rod. Post 51 may be shaped to accept differing diamonds.

The mold is designed to be evacuated, heated and cooled as a unit. The charges in each of the mold cavities, which may be a hundred or more in number, must be carefully selected in terms of melting point so each charge may be sequentially acted upon during the process. The process is schematically illustrated in the diagram of FIG. 3 wherein the first step is to load the charge in the mold at ambient temperatures. The mold is then evacuated, preferably at ambient temperature, to a pressure of one micron or less of mercury. The mold is then heated, and outgassing takes place. The mold may optionally be outgassed by briefly holding the temperature to about 700° C. The mold is then sequentially heated or the temperature continuously raised to a temperature of about 1,000° C, depending upon the brazing alloy of which foils 38, 41 are comprised. An alloy of 72 parts gold, 22 parts nickel and 6 parts chromium melts at approximately 1,000° C and has been found to wet the diamond surfaces to aid a bond with the casting metal. The temperature is then increased again or continues to rise to melt the casting slug which can be OFHC copper liquefying at about 1,100° C. Both the melting of the brazing alloy and the casting slug are accomplished under vacuum conditions wherein the vacuum does not exceed 30 microns of mercury. A much lower vacuum level is preferable. A time interval of exposure to heat above 950° C between 30 seconds to 10 minutes minimizes graphitization of the diamond surface. After both the brazing alloy and the casting slug have melted and flowed about the diamond crystal within the cavity, taking on the configuration of the cavity, the temperature of the mold is reduced at a rate to promote annealing of the cast material of the unified charge. Preferably, the cooling step is at a reduced vacuum level of one micron of mercury. Once the mold has reached working temperature the mold layers may be disassembled and the unified charge tapped out by means of the tungsten rod 28 or lifted out by means of the rod should the rod and the charge now be unified. The mold can then be readily assembled and recharged.

It has been found that diamonds vary in their structure and content with respect to their heat transfer characteristics. While the process is applicable to diamonds of any size or shape, and thus eliminates preliminary cutting and/or lapping operations, it is desirable to presort the diamonds to select those of higher thermal conductivity. The diamonds should be thoroughly cleansed by suitable reagents together with ultrasonic cleaning. The brazing alloy and casting metal should, of course, be similarly clean to promote good bonding and casting.

The brazing preform alloy is selected to have a melting point above the anticipated succeeding operations, say, above 750° C minimum. The alloys should have a transition metal content which causes wetting of the diamond surface and also have a substantial gold, silver or copper content for thermal conductivity. The casting metal is selected for high thermal conductivity and a melting point significantly above that of the brazing alloy. Pure metals such as silver, copper or gold are preferred. The brazing alloy is preferably used in thin preshaped wafers, preferably in a range of ½ to 1 mil thick, so as to present minimum thermal resistance, inasmuch as the thermal conductivity of the alloys is significantly less than that of the metals used for the casting slugs.

It is to be anticipated from previous research that the transition metals will have superior "wetting" characteristics with respect to carbon and diamond crystals. Patents, such as U.S. Pat. No. 3,192,620 to Huizing and van Daal issued July 6, 1965 and U.S. Pat. No. 3,412,455 issued to Bronnes, Hughes and Sweet on Nov. 26, 1968, have indicated the potential of transition metal materials for this purpose. However, applicant's process and apparatus greatly simplify the effecting of union between the wetting alloys and the casting or welding materials to form a diamond heat sink unit which may be readily handled for shaping and mounting after the process of union, in addition to insuring a superior metal-to-diamond bond.

The following tabulation shows the metal elements which experiments indicate will be usable in the process of the invention:

a. TRANSITION METAL ELEMENTS

| Period | Group III | IV | V | VI | VII | VIII | | |
|---|---|---|---|---|---|---|---|---|
| 4 | Sc | Ti | V | Cr | Mn | Fe | Co | Ni |
| 5 | Y | Zr | Nb | Mo | Tc | Ru | Rh | Pd |
| 6 | La | Hf | Ta | W | Re | Os | Ir | Pt | b. ELEMENTS IN THE LANTHANIDE SERIES
c. ELEMENTS IN THE ACTINIDE SERIES
d. Aluminum, silicon and boron.

Specific examples of transition metal alloys useful for the purposes of the process are as follows:

| Description | Composition Range (wt) | Preferred Composition | Liquidus (at)Temp. °C |
|---|---|---|---|
| Gold-molybdenum | 0.1–10% Mo | 1.25% Mo | 1054 |
| Gold-chromium | 0.1–10% Cr | 1.25% Cr | 1065 |
| Gold-vanadium | 0.1–6.0% V | 1.25% V | 1057 |
| Gold-chrom.-nickel | 0.1–10% Cr, 0.1–30% Ni | 6.0% Cr, 22.0% Ni | 1000 |
| Gold-zirconium | 0.1–5% Zr | 0.5% Zr | 1063 |
| Gold-titanium | 0.1–5% Ti | 0.5% Ti | 1066 |
| Gold-praseodymium | 0.1–10% Pr | 0.2% Pr | 1059 |
| Silver-zirconium | 0.1–5% Zr | 0.2% Zr | 960 |
| Silver-chromium | 0.1–2% Cr | 1.0% Cr | 980 |
| Silver-titanium | 0.1–2% Ti | 1.0% Ti | 1000 |
| Copper-zirconium | 0.1–2% Zr | 0.15% Zr (AMZIRC) | 1000 |
| Copper-chromium | 0.1–2% Cr | 1.0% Cr (AMCHROM) | 1075 |
| Copper-titanium | 0.1–6% Ti | 0.5% Ti | 1081 |

The legend "(wt)" indicates by weight and the legend "(at)" indicates atomic weight. "AMZIRC" and "AMCHROM" are trademarks of American Metal Climax, Inc.

FIGS. 4–11 illustrate various mold charges and the resultant mold product made by the process and apparatus of the invention. For instance, FIGS. 4–7 schematically illustrate a charge and resultant product at various stages of the process. In FIG. 4 the tungsten rod 28 is shown combined with a casting slug 42, a downwardly concave foil 41, a macle like the macle 39, an upwardly concave foil 38 and a concave casting slug 37. The parts are shown exploded in the order they are stacked in the cavity 23 of FIG. 2.

The described step by step heat process of the invention welds the elements of FIG. 4 into a mandrel and diamond assembly 82 in which the macle 39 is shown in dotted lines, embedded in the united casting slug 83. A dashed line 84 indicates a cut made to the macle through the slug 83 to result in the mandrel-mounted assembly 82 of FIG. 6 wherein a slug portion indicated at dotted lines 85 is removed and the macle is polished to have a planar face 87 exposed in the casting slug now welded to the rod 28.

Figure 7:
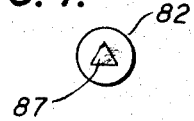
FIG. 7 is an end view of the assembly of FIG. 6.

FIG. 7 is an end view showing that the macle may be triangular, like the "window" macle of FIG. 1C.

Figure 8:
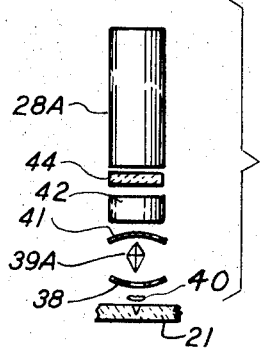
FIG. 8 is an exploded elevational view of an alternate stack for placement within a mold cavity.
Figure 9:
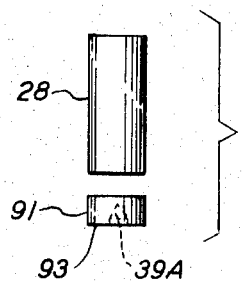
FIG. 9 is an elevation of the molded assembly of FIG. 8 removed from the mold.

FIGS. 8 and 9 show the stacked and then processed heat sink elements in an alternate combination of elements. In FIG. 8 a mandrel or tungsten rod 28 is placed in the mold upon an apertured concave foil of brazing alloy 38, a diamond 39A, a second brazing foil 41, a casting slug 42 and a ceramic separating disc 44. The apertures in the foil and plate 21 locate the diamond. When processed in the mold in accordance with the invention, the rod 28 and the resultant heat sink casting are separable because of the ceramic separator and the rod and the resultant casting 91 with its contained macle 39A are separate. The lower surface 93 of the resultant casting may be machined or lapped such that the lower surface of the macle and the casting are coplanar and thus adapted to certain heat sink installations.

Figure 10:
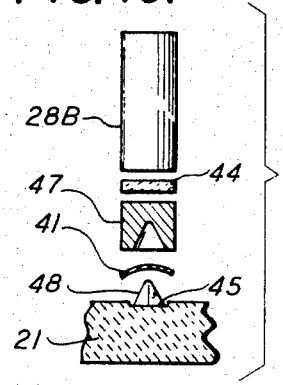
FIG. 10 is a schematic exploded sectional elevation of a further alternate stack assembly.
Figure 5:
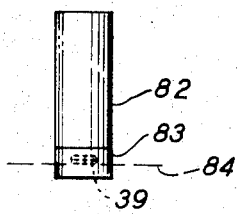
FIG. 5 illustrates the molded assembly as removed from the mold.
Figure 11:
FIG. 11 is a view in sectional elevation of the unified molded part of FIG. 10 removed from the mold.
Figure 6:
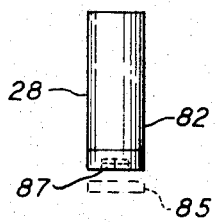
FIG. 6 is an elevational view of the finished part.
Figure 12:
FIG. 12 is an end view of the molded part of FIG. 11.

FIGS. 10, 11 and 12 illustrate an alternate process of the invention wherein a half crystal 48 rests within the mold cavity (not shown) in a depression 45 of the mold plate 21 and, as demonstrated schematically in FIG. 10, the diamond 48 is imposed upon first by a downwardly concave brazing foil 41 and a hollow casting slug 47 which is separated from the tungsten rod 28B by a ceramic disc, such as the disc 44. When the rod 28B is impelled against the other charge elements in the cavity by a weight, such as the weight 27B (not shown), the resultant cast 95 removed from the mold is as shown in FIGS. 11 and 12, the lower surface 97 of the casting and the lower surface 98 of the half crystal being coplanar.

As indicated in FIGS. 11 and 12, the diamond 48 of those Figures is one-half of an octahedron crystal, like that of FIG. 1C.

It is not known why the transitional elements and other like elements "wet" the surface of the diamond and form a coating to which copper and other high conductivity elements may be welded. It is theorized that a physico-chemical bond results due to the previously described condition of the electron d-shell of the transitional element.

Whatever theory proves to be correct, it is evident that the process of the invention provides an effective mechanical and heat transfer bond between diamonds, whose surfaces need not necessarily be polished, and welding materials such as copper, silver and gold for the effective retention of diamonds in heat sinks and other tools which may be accomplished by a sequential heating process within a mold charged in a single set-up.

Many variations within the scope of the invention will occur to those skilled in this particular art. The modifications of process and apparatus disclosed above are illustrative only and it is desired that the scope of the invention be measured by the appended claims, rather than by the merely representative disclosure herein.

I claim:

1. A process for fabricating diamond heat sinks and tools including the steps of charging a mold cavity with a stack having a diamond, a brazing alloy wafer and a casting slug, imposing a weight upon the stack, evacuating the mold, melting the brazing alloy wafer, then melting the casting slug, continuing to impose weight upon the melted wafer and slug such that the liquefied metal flows about the diamond, and reducing the mold heat at a controlled rate for annealing the resultant bonded casting slug and alloy.

2. A process in accordance with claim 1 wherein the vacuum pressure during the process does not exceed thirty microns of mercury.

3. A process in accordance with claim 2 wherein the steps of melting the brazing alloy wafer and the casting slug are performed in a reduced atmosphere approximating one micron of mercury.

4. A process in accordance with claim 1 further including the step of first heating the evacuated mold to a temperature below the melting point of the brazing alloy and the casting slug to outgas the mold.

5. A process in accordance with claim 1 wherein the charging of the mold cavity includes the steps of placing an upwardly concave transitional element alloy brazing wafer in the mold cavity, centering a diamond macle in the brazing alloy wafer, capping the diamond macle with a downwardly concave brazing alloy wafer of a transitional element alloy, superimposing a casting slug upon the diamond and brazing alloy wafers, imposing a rod upon the casting slug and resting a weight upon the rod within the mold.

6. A process in accordance with claim 1 wherein the process of charging the mold cavity includes the steps of forming a recess in the bottom of the mold cavity, placing a diamond crystal within the recess, placing a brazing alloy wafer on the diamond, placing a casting slug upon the brazing alloy wafer, and placing a weight upon the casting slug.

7. A process in accordance with claim 1 including the step of separating the casting slug from the imposing weight with an inert wafer.

8. A process in accordance with claim 1 wherein after evacuating the mold the temperature of the mold and charge is raised to the melting point of the brazing alloy wafer and then the temperature is raised to the melting point of the casting slug, each of the temperatures being maintained for a cumulative time period less than the maximum tolerance of the diamond crystal to the heat range of the melting points.

9. A process in accordance with claim 1 wherein the brazing alloy wafer is an alloy of a heat-conducting element taken from a first group consisting of gold, silver and copper, alloyed with a smaller proportion of at least one element taken from a second group consisting of the transition metal elements, elements in the lanthanide series, elements in the actinide series, aluminum, silicon and boron.

10. A process in accordance with claim 9 wherein the proportion of the metal from the second group is between 0.1 to 30 percent by weight of the resulting alloy with the metal of the first group.

11. A bonding process for forming diamond heat sinks and tools and including the steps of forming a single stacked charge in a mold cavity, evacuating the mold to a vacuum level of less than thirty microns of mercury, heating the mold and charge to approximately 700° C. to outgas the mold, raising the temperature of the mold and charge to melt one of the components of the charge, raising the temperature of the mold and charge to melt the second component of the charge, and lowering the temperature of the mold and charge at a rate commensurate with annealing the unified charge within the mold cavity.

12. A bonding process in accordance with claim 11 further including the step of imposing a weight upon the charge in the mold cavity.

* * * * *